(12) United States Patent
Mason

(10) Patent No.: US 6,794,586 B1
(45) Date of Patent: Sep. 21, 2004

(54) SYSTEM AND METHOD FOR CONTROLLING WEIGHING OPERATIONS AT A SCALE OF A SELF-CHECKOUT TERMINAL

(75) Inventor: Timothy E. Mason, Buford, GA (US)

(73) Assignee: NCR Corporation, Dayton, OH (US)

( * ) Notice: Subject to any disclaimer, the term of this patent is extended or adjusted under 35 U.S.C. 154(b) by 215 days.

(21) Appl. No.: 10/185,885

(22) Filed: Jun. 27, 2002

(51) Int. Cl.[7] .............................................. G01G 19/40
(52) U.S. Cl. ................... 177/25.15; 177/185; 702/101; 705/415; 235/383
(58) Field of Search ................................ 702/101, 102; 705/415; 235/383; 177/25.15, 184, 185

(56) References Cited

U.S. PATENT DOCUMENTS

| | | | | |
|---|---|---|---|---|
| 4,379,495 A | * | 4/1983 | Cocks et al. ................... 177/1 |
| 4,553,619 A | * | 11/1985 | Fujinaga ...................... 177/185 |
| 4,660,160 A | * | 4/1987 | Tajima et al. ................ 702/173 |
| 4,660,662 A | * | 4/1987 | Katz ............................. 177/50 |
| 4,715,457 A | * | 12/1987 | Amacher et al. ............... 177/1 |
| 4,782,904 A | * | 11/1988 | Brock .......................... 177/185 |
| 5,074,368 A | * | 12/1991 | Bullivant ...................... 177/50 |
| 5,125,465 A | * | 6/1992 | Schneider ..................... 177/50 |
| 6,047,262 A | | 4/2000 | Lutz .............................. 705/16 |
| 6,080,938 A | * | 6/2000 | Lutz ......................... 177/25.15 |
| 6,105,866 A | | 8/2000 | Morrison et al. ........... 235/383 |
| 6,177,637 B1 | * | 1/2001 | Evans ..................... 177/25.13 |
| 6,215,078 B1 | * | 4/2001 | Torres et al. ............. 177/25.15 |

* cited by examiner

Primary Examiner—Randy W. Gibson
(74) Attorney, Agent, or Firm—Maginot, Moore & Beck LLP; Paul W. Martin

(57) ABSTRACT

A system provides a more robust measurement of scanned items at a self-checkout station. The system comprises an item verifier for verifying placement of an item on a scale of a self-checkout station and a measurement adjuster operatively coupled to the item verifier for adjusting the item verifier operation in response to an error signal from the item verifier. In one embodiment, the measurement adjuster increases the number of samples for determining the weight of an item. By increasing the number of samples collected before determining item weight, the probability that temporary vibrations will not disturb weight measurement is increased. An exemplary method to implement the system includes verifying placement of an item on a scale and adjusting the weighing of the item in response to a failure to sense a weight that corresponds to the item placed on the scale. The adjustment may include increasing the number of samples collected or the time between samples.

18 Claims, 2 Drawing Sheets

US 6,794,586 B1

SYSTEM AND METHOD FOR CONTROLLING WEIGHING OPERATIONS AT A SCALE OF A SELF-CHECKOUT TERMINAL

FIELD OF THE INVENTION

This invention relates generally to methods and systems for facilitating transactions at a self-checkout terminal and, more particularly, to methods and systems for facilitating transaction at self-checkout terminals with scales.

BACKGROUND OF THE INVENTION

Self-checkout terminals at grocery stores and other retail stores are well known. The terminals permit a consumer to present items for purchase to sensors at the terminal so the terminal can identify the items and a corresponding price. When the consumer indicates all items for purchase have been presented to the terminal, a sub-total is accumulated, any taxes and discounts are computed, and a total amount due is displayed for the consumer. The terminal then allows the consumer to select a payment method. The terminal presents menu selections to the consumer so funds are transferred to the retailer's account. Upon confirmation of payment, the items are released to the consumer.

A self-checkout terminal typically includes a display, a scanner for reading unit price codes (UPC), and a checkout area for holding items once they have been scanned. The checkout area may include a motor driven belt to carry items for which a purchase has been verified to a collection area. The terminal also includes a processor, memory, programmed instructions, and data peripherals to control the operations of the terminal. The programmed instructions may contain modules for querying for item prices, computing totals and performing other functions related to the purchase of items through a self-checkout terminal. Some checkout terminals may also include a security application program that operates to reduce the likelihood that the consumer leaves without scanning all of the items or exchanges scanned items with more expensive items that have not been scanned. In many self-checkout terminals, the surface area of the checkout area or belt has a scale underneath it to help track items during checkout. By monitoring the weight of items placed on the checkout area, the security application is able to determine some actions of the consumer for purposes of detecting fraud or operator error by a consumer. For example, the change in weight detected by the scales of the checkout area may be used to determine the weight of an item just placed on the checkout area. This item weight may then be compared to the weight of the item last scanned that is stored in a database or other memory. If the weights are different, the security application program notifies the consumer and prompts the consumer to remove the item and scan the item again to rectify the discrepancy. Thus, the application program is capable of tracking the scanning of items and their placement on the checkout area through its monitoring of the scales associated with the checkout area.

While this type of item monitoring is useful for security tracking purposes it does have some drawbacks. For one, activities in the vicinity of the scales may affect the accuracy of the weighing operations. For example, vibrations caused by carts or other objects impacting a self-checkout station may oscillate one or more items on the scale and displace the items with respect to the weighing transducers. Other activities that may affect weighing operations include pressure from a consumer's hand on an item, the serial placement of items on the scale that were purchased at the same time, or air pressure from air ducts located near the checkout station. For example, a consumer may scan a group of three oranges having a single unit price (3 oranges/$1) and then place them one at a time on the scales.

Activities like the ones described cause measurements of the weight of items placed on the scales to fluctuate. These fluctuations result in measured weights that do not correspond to the weight stored in association with an item's bar code or other identifier. In previously known self-checkout stations, the scale control software requires N weight readings within a tolerance T of a weight value stored in association with an item identifier such as its bar code. Fluctuations in weight readings may prevent the accumulation of N readings within a weight sampling period and cause the terminal control software to determine that an item placed on the scales does not correspond to a scanned item. The checkout process is then delayed until the weight of the scanned item is verified. Verification may require rescanning by the consumer after the last item is removed from the items scanned list or it may require the intervention of a cashier or other self-checkout station attendant. Both verification procedures are time-consuming and adversely impact the efficiency of the self-checkout process.

What is needed is a system and method of weighing scanned items that compensates for weighing irregularities caused by activities in the vicinity of the self-checkout station.

What is needed is a system and method for measuring the weight of scanned items at a self-checkout station that reduces the necessity of rescanning items or attendant intervention to verify the weight of an item.

SUMMARY OF THE INVENTION

The above-noted limitations of previously known systems and methods for tracking items in the checkout area of a self-checkout terminal have been overcome by a system and method that operate in accordance with the principles of the present invention. The system of the present invention comprises an item verifier for verifying placement of an item on a scale of a self-checkout station and a measurement adjuster operatively coupled to the item verifier for adjusting the item verifier operation in response to an erroneous reading signal from the item verifier.

In one embodiment of the present invention, the measurement adjuster increases the number of samples required by the item verifier for determining the weight of an item. By increasing the number of samples collected before determining the weight of the item, the probability that temporary vibrations will not disturb an accurate weight measurement is increased. For example, if N weight measurements with tolerance T are required to verify the placement of an item on scale then an increase in the number of samples collected provides more time for vibrations to dampen or a consumer's hand to be removed from the item. In another embodiment of the present invention, the period between samples is increased so an accurate weight measurement may be obtained without interference from vibrations, a consumer's hand, or the like.

The system of the present invention may be implemented with a self-checkout terminal that includes a display, a bar code scanner, and a checkout scale, all of which are coupled to the processor for the terminal. The checkout scale may include a processor operated by programmed instructions with memory for collecting and analyzing weight data or it may provide the weight data to data peripheral interfaces for the terminal processor. The program memory of the terminal processor may include one or more program modules for determining whether the checkout scale processor requires adjustment. The program memory may also include a security application that uses the item weight data to track items in the checkout area. The display may be used to communicate with the consumer regarding movement of items in the checkout area.

The method of the present invention includes verifying placement of an item on a scale of a self-checkout station and adjusting the weighing of the item in response to a failure to sense a weight corresponding to the identification of the item placed on the scale. The adjustment may be an increase in the number of weight samples collected for verification so the likelihood of collecting a prerequisite number of samples within the toleration range for verification is increased. Alternatively, the adjustment may be an increase in the time between weight measurement samples. These adjustments increase the time required for measuring the weight of an item placed on a scale, however, they reduce the likelihood that the weight measured by the scale is erroneous because of temporary activities in the vicinity of the checkout station. Erroneous weight readings necessitate a consumer rescanning an item or a self-checkout attendant intervening in the checkout procedure. Thus, the method of the present invention reduces the occurrence of problems with self-checkout that are associated with erroneous weight measurements caused by temporary perturbations in the sensing of the weight on the scale of the self-checkout station.

It is an object of the present invention to provide a more robust scheme for measuring the weight of items placed on the scale of a self checkout station.

It is an object of the present invention to provide an adjustment to the process of determining the weight of an item placed on the scale of a self-checkout station so fluctuations are less likely to prevent the verification of a scanned item.

It is an object of the present invention to increase the time for determining the weight of a scanned item placed on the scale of a self-checkout station so that an accurate measurement of the item's weight is not disturbed by temporary vibrations or additional weight.

These and other advantages and features of the present invention may be discerned from reviewing the accompanying drawings and the detailed description of the invention.

BRIEF DESCRIPTION OF THE DRAWINGS

The present invention may take form in various system and method components and arrangement of system and method components. The drawings are only for purposes of illustrating an exemplary embodiment and are not to be construed as limiting the invention.

DETAILED DESCRIPTION OF THE INVENTION

Figure 1:
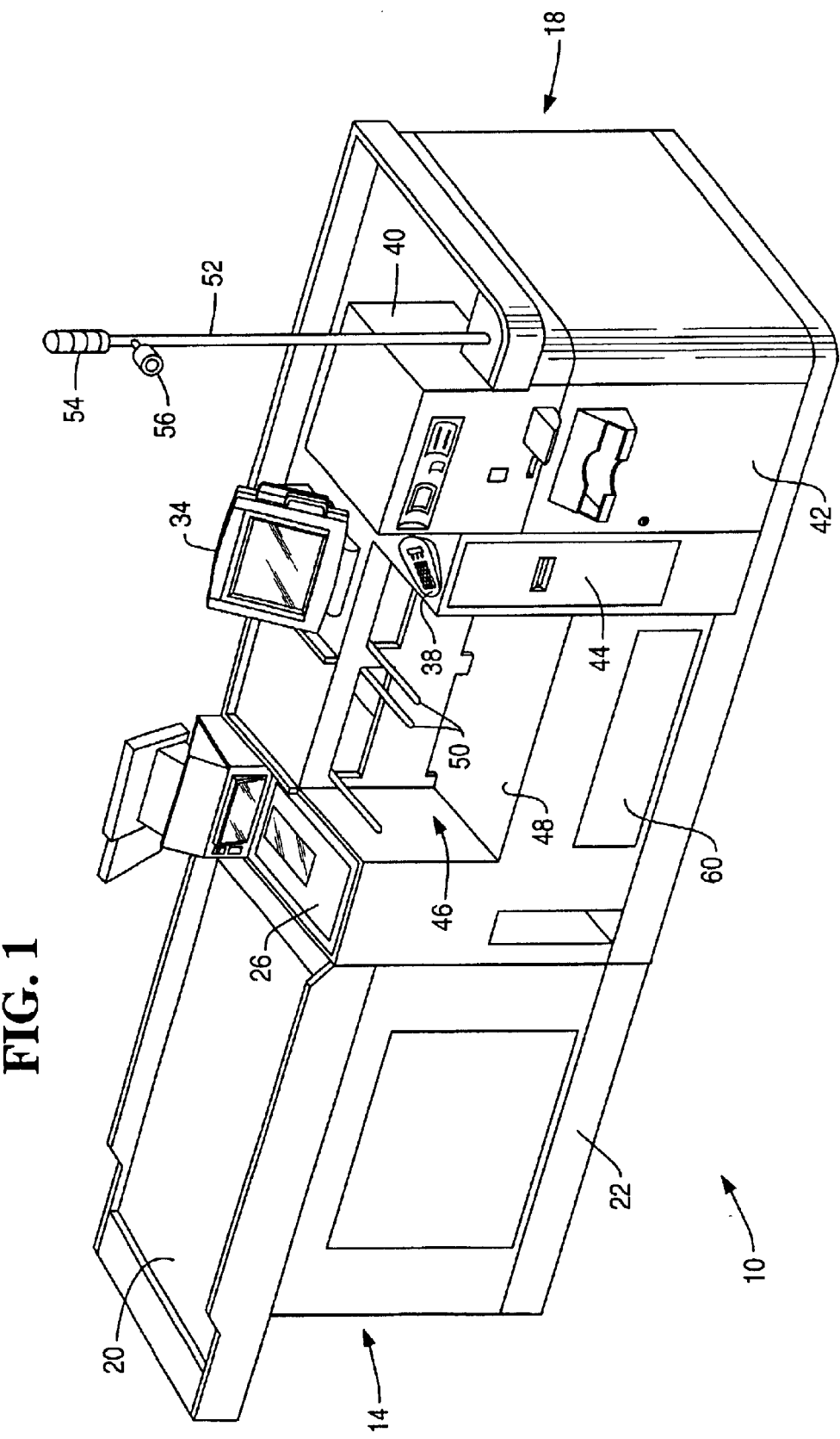
FIG. 1 depicts a block diagram of a self-checkout station in which the present invention may be used.

A self-checkout station used with the system and method of the present invention is shown in FIG. 1. Checkout station 10 may include a feeder unit 14 and a checkstand 18. Feeder unit 14 includes a feeder belt 20 and housing 22 for the motor and control circuitry that operates feeder belt 20. Feeder unit 14 is movably coupled to checkstand 18 so the feeder belt may be aligned with scanner/scale unit 26. Checkstand 18 includes scanner/scale unit 26, consumer terminal 34, a payment terminal 38 for entry of payment data, and receipt printer 44. Scanner/scale unit 26 uses a laser shining on a glass or other transparent platen to input data from bar codes applied to products or packages. Unit 26 may also include a scale for measuring the weight of items that are sold on a price/unit of weight basis. Consumer terminal 34 displays item data as it is entered through scanner/scale unit 26. Payment terminal 38 may be any known POS terminal that incorporates a keypad and card reader to support credit card, debit card, and other payment methods. Receipt printer 44 provides a consumer with a receipt itemizing the items purchased and the method of payment.

Separating receipt printer 44 and scanner/scale unit 26 is a bagwell 46, which has a floor that is adjoined to three upright walls. The floor of bagwell 46 may rest on scale 48. Consumers place scanned items in bags hanging from rails 50 in bagwell 46 so the items rest on the floor of bagwell 46 and scale 48. Security scale 48 uses item weight data derived from scanner/scale 26 or a database using a scanned unit product code (UPC) to verify that only the items scanned are placed on the security scale. Security application programs operating within terminal 34 monitor security scale 48 to determine whether items not scanned have been added to the security scale area. An anomalous condition that requires investigation may be signaled by lighting a warning or alert light color within the tri-color indicator 54 mounted at the terminal end of indicator pole 52 of checkstand 18. Indicator pole 52 may also have mounted thereon a security camera 56 for providing a video signal to a security officer surveillance area or to some storage media. A database, disk drive, or other computer peripheral required for station operation may be housed within peripheral tray 60 located within checkstand 18. Checkstand 18 also includes currency acceptor 40 for receiving units of paper currency and coins from a consumer as payment for a transaction while cash dispenser 42 returns change to a consumer or funds requested from a debit account or the like.

As shown in FIG. 1, a consumer may place items on feeder belt 20 and belt 20 is driven to bring items to the end of belt 20 where a shut-off mechanism stops belt 20. The consumer may commence a transaction by removing items from belt 20 and moving them, one at a time, over scanner/scale 26 for item product data retrieval and/or weighing. The scanned items may then be placed in bags on security scale 48. Once all of the items are scanned, a consumer may provide payment through payment terminal 38 or currency acceptor 40, receive change from dispenser 42, and a receipt from printer 44. The consumer may then remove the bags from security scale 48 and leave station 10 to complete a transaction.

Figure 2:
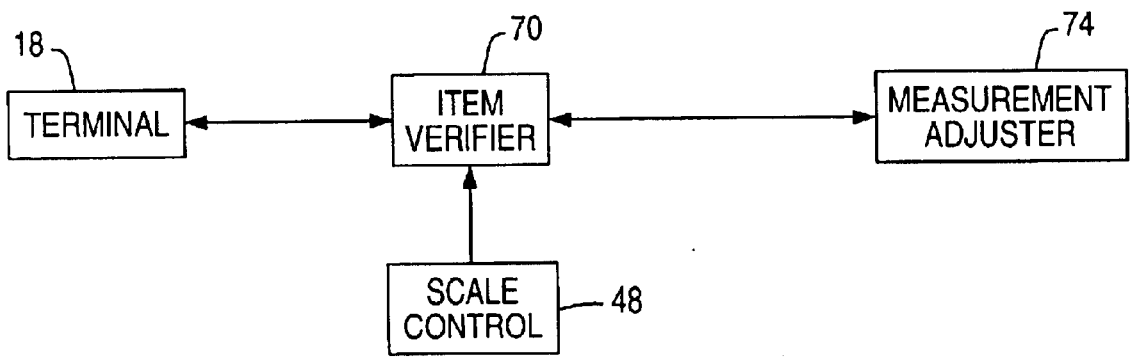
FIG. 2 is a block diagram of an exemplary embodiment of the components for adjusting the weight measurement of items scanned by the station shown in FIG. 1.

In one embodiment of the present invention, an item weighing adjustment system may reside in the computer that controls terminal operation for the checkout stand or in the computer that controls operation of scale 48. The item weighing adjustment system includes the components shown in the block diagram of FIG. 2. System 68 includes an item verifier 70 and a measurement adjuster 74. Item verifier 70 receives weight data sensed by scale 48 as well as weight data stored in association with an identifier for the last item scanned. Verifier 70 compares the sensed weight data to the stored weight data to determine whether the sensed data is within a tolerance range about the stored weight data for the scanned item. Verifier 70 generates a signal indicative of whether the sensed weight data is in the tolerance range about the stored weight data and transmits the weight reading signal to measurement adjuster 74. In response to the signal, measurement adjuster 74 determines whether to adjust the verification process of verifier 70. After the verifier 70 completes the verification process, it generates a verification signal and the state of that signal indicates to the program controlling terminal 34 whether the last scanned item was placed on scale 48 or not. The security program of terminal 34 may then determine the appropriate response for reducing the likelihood of fraudulent activity in the ongoing transaction.

Figure 3:
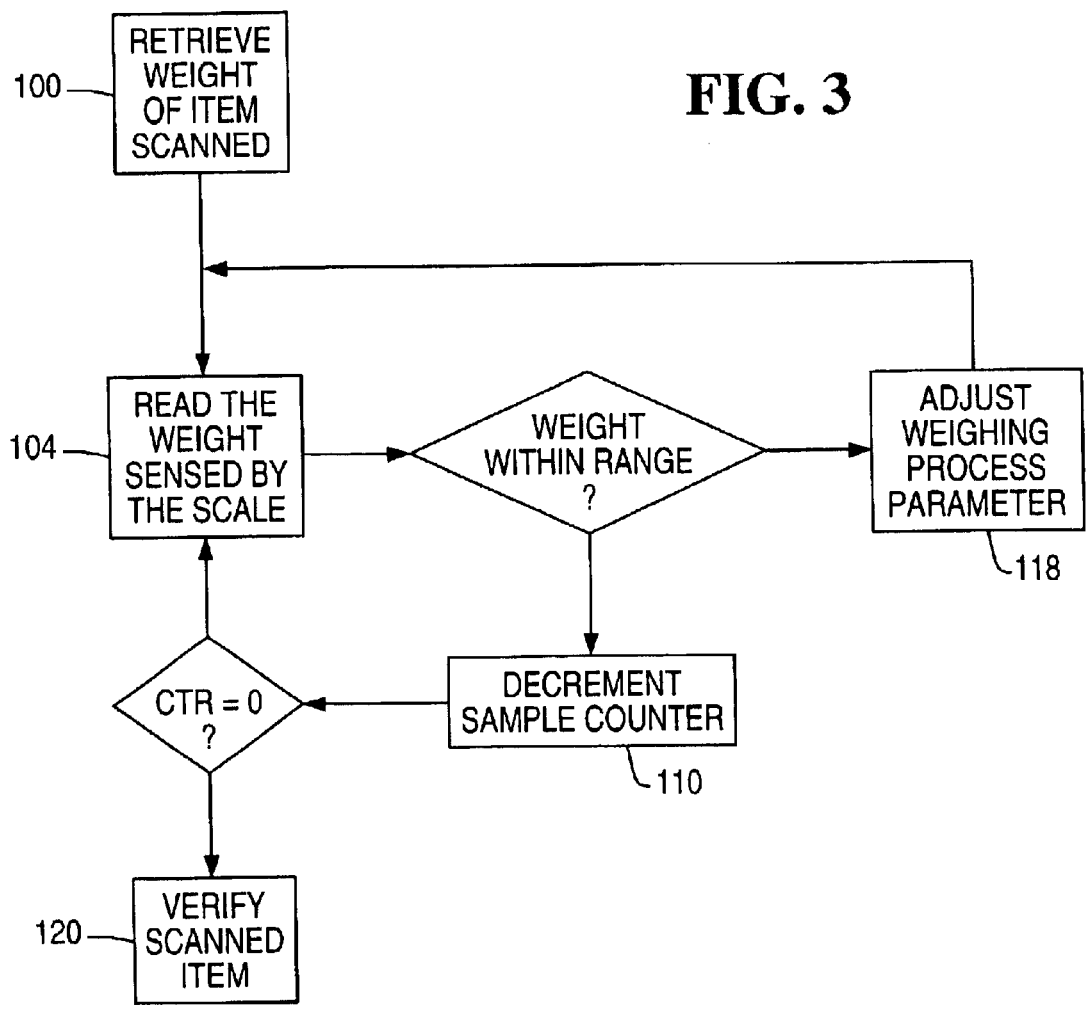
FIG. 3 is a flowchart of an exemplary method for adjusting the verification of items scanned by the station shown in FIG. 1.

An exemplary process that may be implemented by verifier 70 and adjuster 74 in accordance with the principles of the present invention is shown in FIG. 3. The process retrieves the stored weight for the last scanned item (block 100) and also receives the latest weight reading from scale 48 (block 104). The sensed weight reading is compared to the retrieved weight data to determine whether it is within a tolerance range about the retrieved weight data (block 108). This may be performed by a number of methods. One method is to read the total weight of the scale and subtract the last verified reading to determine a differential weight that corresponds to the weight of the last scanned item. A tolerance weight T may then be added to and subtracted from the retrieved weight for the item. This tolerance weight range may then be compared to the differential weight. Alternatively, the retrieved weight may be added to the last verified reading and the tolerance weight T may then be added to and subtracted from this value to determine the tolerance range for comparison with the weight readings.

If a weight reading is within the computed tolerance range, the sample counter for weight readings is reduced (block 110) and verifier 70 may generate an in-range weight reading signal for adjuster 74 that is indicative of a weight reading within the tolerance range. The sample counter is initialized at the beginning of an item verification to a number of samples that have been determined adequate for establishing a stable reading from scale 48. The number of samples N1 is set at a number that provides a reliably accurate weight reading within a minimum time for item verification when scale 48 is not subject to activities that affect the accuracy of weight measurement. The number of samples for this minimum time may determined by empirical data before placing system 68 into operation or it may be determined from an analysis of historical weight data by verifier 70, adjuster 74, or terminal 34. The samples may be read at a periodic rate so that the N1 samples define a weight sampling period for an item verification performed by verifier 70. Alternatively, the samples may be acquired at a rate that is not periodic. While the number of samples N1 may be used to initialize the sample counter for an item verification and then decremented, the number of samples may alternatively be used as a threshold to compare to a count accumulated in the sample counter as weight readings are obtained for item verification.

A determination is made as to whether all of the samples required for verifying that the weight of the item placed on the scale is within the tolerance range have been received (block 114). If not, the process continues until the reading stabilizes and the reading is verified as being within the tolerance range for the last scanned item. If a sensed weight is not within the tolerance range, verifier 70 generates an erroneous reading signal that is sent to adjuster 74. Adjuster 74 may then determine what, if any, adjustment is made to the verification process (block 118). In response to the error signal, adjuster 74 may count the number of erroneous readings and only adjust the verification process when the number of erroneous signals exceeds a threshold. Alternatively, adjuster 74 may adjust the verification process upon receipt of a single error signal.

Adjustment of the verification process may be made in a number of ways. For one, adjuster 74 may provide a new value for the sample counter that increases the number of samples required for item verification. Alternatively, adjuster 74 may alter the rate at which verifier 70 receives sensed weight data from scale 48. Both of these adjustments increase the time for measuring the weight increase caused by placement of the last scanned item on scale 48. This increase in weight sampling time improves the chances of obtaining an accurate measurement that is not erroneously altered by vibrations, a lingering hand on the item, or serial placement of items in a single transaction unit. However, the adjustment does not adversely impact the ability of verifier 70 to detect the substitution of items on scale 48 that do not conform to the tolerance range about the weight stored for a last scanned item. Once the number of samples for determining the weight of a scanned item have been obtained, verifier 70 generates a signal for terminal 34 that indicates whether the weight of the item placed on the scale corresponds with the weight data stored for the last scanned item (120).

The system and method of the present invention may be implemented by adding functionality to an existing self-checkout terminal. That is, hardware and software may be added to existing checkout station processors, such as the processor terminal 34, scale 48, or a combination thereof. The system and method of the present invention provide a security application of terminal 34 with more robust data as the item verification analysis based on item weight becomes more resilient against false or erroneous readings arising from temporary activities in the vicinity of station 10.

While the present invention has been illustrated by the description of exemplary processes and system components, and while the various processes and components have been described in considerable detail, it is not the intention of the applicant to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A system for adjusting the weighing of scanned items at a self-checkout station comprising:

an item verifier for verifying placement of a scanned item on a scale of a self-checkout station; and a measurement adjuster operatively coupled to the item verifier for adjusting the item verifier operation in response to an error reading signal from the item verifier so that the item verifier increases the time for establishing a weight measurement for the scanned item, wherein the measurement adjuster increases the time between samples collected by the item verifier for verifying placement of the scanned item.

2. The system of claim 1 wherein the measurement adjuster increases the number of reading samples required by the item verifier for verifying placement of the scanned item.

3. The system of claim 1 wherein the item verifier generates an erroneous reading signal in response to a sensed weight reading not being within a tolerance range.

4. The system of claim 1 wherein the item verifier generates an in-range weight reading signal in response to a sensed weight reading being within a tolerance range.

5. The system of claim 2 wherein the item verifier generates an in-range weight reading signal in response to a sensed weight reading being within a tolerance range.

6. The system of claim 2 wherein the item verifier generates an in-range weight reading signal in response to a sensed weight reading being within a tolerance range.

7. The system of claim 1 wherein the item verifier generates an erroneous reading signal in response to a sensed weight reading not being within a tolerance range.

8. The system of claim 1 wherein the item verifier generates an in-range weight reading signal in response to a sensed weight reading being within a tolerance range.

9. A method for adjusting the weighing of scanned items at a self-checkout station comprising:

verifying placement of a scanned item on a scale of a self-checkout station; and adjusting the placement verification in response to an error reading signal by increasing the time between samples collected for verification of the placement of the scanned item.

10. The method of claim 9 wherein the verification adjustment is performed by increasing the number of reading samples required for verification of the placement of the scanned item.

11. The method of claim 9 further comprising:

generating an erroneous reading signal in response to a sensed weight reading not being within a tolerance range.

12. The method of claim 9 further comprising:

generating an in-range weight reading signal in response to a sensed weight reading being within a tolerance range.

13. The method of claim 10 further comprising:

generating an erroneous reading signal in response to a sensed weight reading not being within a tolerance range.

14. The method of claim 10 further comprising:

generating an in-range weight reading signal in response to a sensed weight reading being within a tolerance range.

15. The method of claim 9 further comprising:

generating an erroneous reading signal in response to a scanned weight reading not being within a tolerance range.

16. The method of claim 9 further comprising:

generating an in-range weight reading signal in response to a sensed weight reading being within a tolerance range.

17. The method of claim 9, the placement verification further comprising:

comparing retrieved weight data to sensed weight data; and verifying placement of the scanned item in response to the sensed weight data being within a tolerance range about the retrieved weight data.

18. The method of claim 17, the placement verification further comprising:

computing the tolerance range from the retrieved weight data.

* * * * *

UNITED STATES PATENT AND TRADEMARK OFFICE
CERTIFICATE OF CORRECTION

PATENT NO.   : 6,794,586 B1
DATED        : September 21, 2004
INVENTOR(S)  : Mason, T. E.

It is certified that error appears in the above-identified patent and that said Letters Patent is hereby corrected as shown below:

Column 8,
Line 15, delete "scanned" and substitute -- sensed --.

Signed and Sealed this

Twenty-sixth Day of April, 2005

JON W. DUDAS
*Director of the United States Patent and Trademark Office*